United States Patent [19]

De Schutter et al.

[11] Patent Number: 4,667,707

[45] Date of Patent: May 26, 1987

[54] METHOD FOR ASSEMBLING THREE-DIMENSIONAL METAL STRUCTURES, MACHINE FOR THE MANUFACTURING THEREOF, AND STRUCTURES OBTAINED WITH SUCH A METHOD

[75] Inventors: André De Schutter, Laarne-Kalken, Belgium; Silvano Casalatina, Pont-Saint-Martin, Italy

[73] Assignee: Sismo International, Larne-Kalken, Belgium

[21] Appl. No.: 725,655

[22] Filed: Apr. 22, 1985

[30] Foreign Application Priority Data

Apr. 24, 1984 [EP] European Pat. Off. ........ 84870056.3

[51] Int. Cl.⁴ ............................................. B21F 15/08
[52] U.S. Cl. ..................................... 140/112; 219/56; 219/87; 219/89
[58] Field of Search ................... 140/112, 140; 219/56, 219/86.31, 86.33, 87, 89

[56] References Cited

U.S. PATENT DOCUMENTS

| | | | |
|---|---|---|---|
| 1,783,948 | 12/1930 | Sommer | 140/112 |
| 2,390,174 | 12/1945 | Roemer | 140/112 |
| 4,340,802 | 7/1982 | Artzer | 140/112 |
| 4,468,550 | 8/1984 | Gött et al. | 219/87 |

Primary Examiner—Frederick R. Schmidt
Assistant Examiner—Robert Showalter
Attorney, Agent, or Firm—Scully, Scott Murphy & Presser

[57] ABSTRACT

A method and apparatus for assembling three-dimensional wire structures. The method includes the steps of preparing a series of plane nettings comprising lengthwise wires and brace wires, and aligning the nettings on holders. The method further includes the steps of placing a pair of cross wires across and against the lengthwise wires of the nettings and welding the cross wires to the nettings. These last two steps are repeated, each time with the nettings in a different position, until the three-dimensional structure is completed.

24 Claims, 20 Drawing Figures

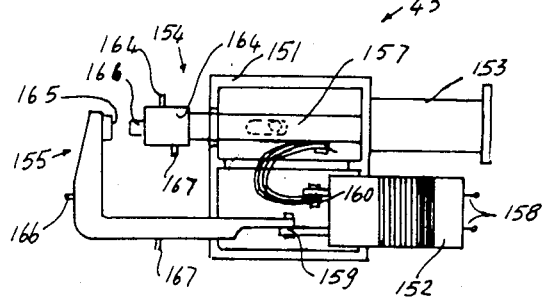
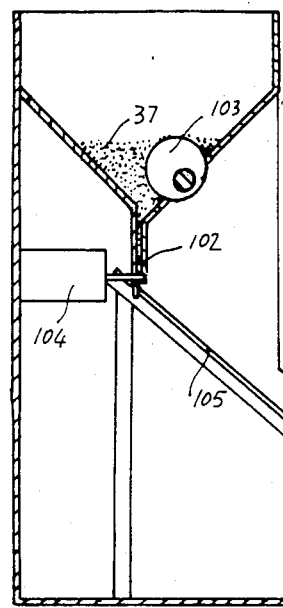
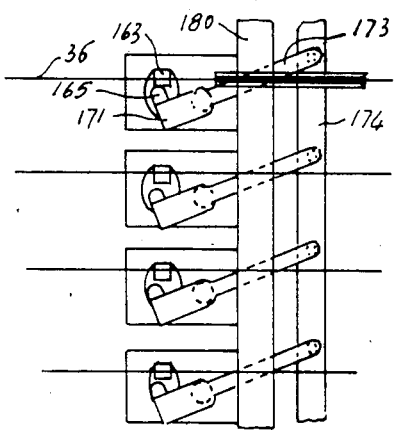
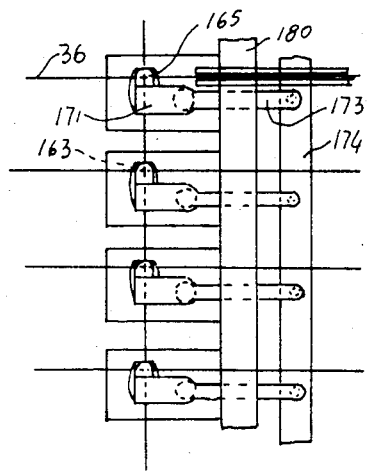

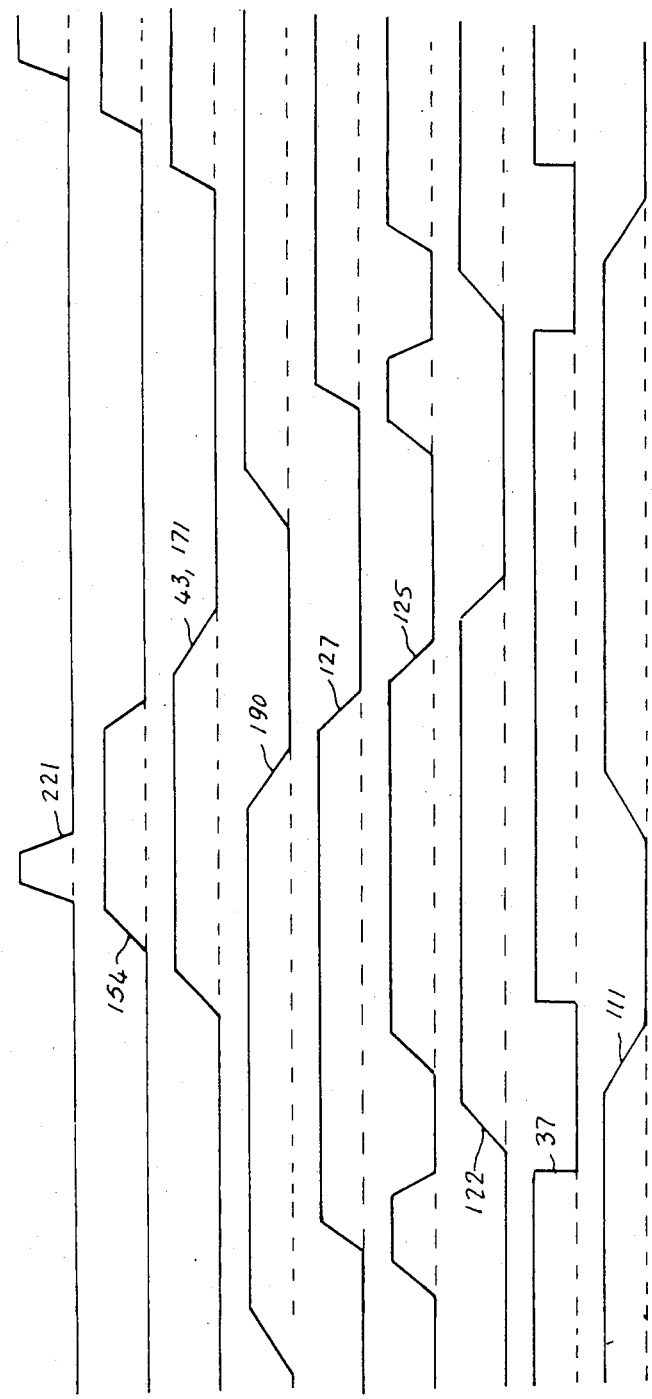

METHOD FOR ASSEMBLING THREE-DIMENSIONAL METAL STRUCTURES, MACHINE FOR THE MANUFACTURING THEREOF, AND STRUCTURES OBTAINED WITH SUCH A METHOD

BACKGROUND OF THE INVENTION

This invention relates to a method for assembling three-dimensional metal structures, for example for pre-manufactured elements such as panels or ceilings to be used for building. The invention further pertains to apparatus for carrying out such a method, and finally to the structure mode with said method.

A three-dimensional wire structure is known which comprises a series of plane nettings. Each netting is provided with at least one pair of lengthwise wires and brace wires. The nettings are spaced apart a pre-determined distance by a series of cross wires welded to the nettings and to brace wires. Such a wire structure forms bearing planes for elongated bodies with a corresponding size, made from a light insulating material which is arranged inside the wire structure. The manufacturing of such structures requires a very small tolerance for the various components and a careful alignment between said parts during the welding steps. To fulfill said requirements, many hand operations are necessary to bring the welding units to the appropriate areas where the wires to be welded cross, and to retain the alignment of said parts. Such a method is thus unavoidably costly. Moreover, it is very difficult to obtain simultaneously the alignment of the various structural portions. Severe problems have also been encountered when manufacturing said structures, particularly as with the reliability of the welds and the resistance of the structure to static and dynamic stresses.

SUMMARY OF THE INVENTION

The present invention pertains to an assembly method which is simple and relatively inexpensive for accurately assembling a three-dimensional wire netting having a high stress resistance. The method according to the invention, comprises the following steps:
  (a) preparing a series of plane nettings comprising lengthwise and brace wires welded together;
  (b) arranging the nettings according to a given crosswise pitch;
  (c) aligning the nettings to locate corresponding brace wires of the different nettings in the same plane;
  (d) aligning the lengthwise wires to define corresponding planes of the structure;
  (e) arranging at least one cross wire in a position where said wire crosses the lengthwise wires or the brace wires of the nettings in different areas of crossing with said lengthwise and brace wires, respectively;
  (f) positioning at least one welding unit in that area where the nettings cross the cross wire, in such a way that the electrodes of said welding unit face the crossing wires in the crossing area;
  (g) engaging the crossing wires and said electrodes to weld the cross wire to the netting
  (h) moving the welding unit relative to the nettings over a distance which is equal to the cross-wire pitch, while retaining the brace wires in the same plane;
  (i) repeating steps (f) to (h) for a new cross wire and a new crossing area until the cross wires are welded to the lengthwise or brace wires of the wire structure.

According to another feature of the invention, the assembly of the nettings which will form the three-dimensional structure comprises the following steps:
  (a) preparing straight wires from drums, by straightening and simultaneously twisting said wires;
  (b) arranging a lengthwise wire group in holders to bring said wires in parallel relationship with one another;
  (c) welding the lengthwise wires to a first brace wire, in such a way that said brace wires substantially lie in the same plane as said lengthwise wire;
  (d) feeding the lengthwise wires relative to said holders, over a distance equal to a brace wire pitch, to define making section;
  (e) arranging a second brace wire in such a way that said wire crosses the marking section of said lengthwise wires, and in such a way that said second brace wire lies at an accurately-defined spacing from the first brace wire;
  (f) welding said second brace wire to the lengthwise wires in the respective crossing areas;
  (g) repeating steps (d) to (f) until all the netting welds have been made.

The three-dimensional structure which is obtained with the method according to the invention has a marked resistance to stresses, due to the twisting of the wires and the twisting of the wires accuracy of the welding. Said structure has for further feature the accuracy in the planes of the various brace wires, to form very small spaces between the elongated bodies which are located inside the structure proper. Moreover, the assembled structure has a very high degree of accuracy, ensuring an accurate arrangement of the panels inside the structure.

BRIEF DESCRIPTION OF THE DRAWINGS

Other details and features of the invention will be apparent from the following description, given by way of non limitative example and with reference to the accompanying drawings, in which:

FIG. 9 is a diagrammatic view along section line IX—IX in FIG. 4.

FIG. 10 is a diagrammatic view showing additional details of the machine as shown in FIG. 2.

FIG. 11 is a diagrammatic view of another detail from the machine as shown in FIG. 2.

FIG. 12 is a plan view of a variation in a detail of the machine as shown in FIG. 2.

FIG. 13 is a diagrammatic side view of the variation as shown in FIG. 12.

FIG. 14 shows the element of FIG. 12 during operation of the machine.

FIG. 15 shows an operating flow-chart of the machine as shown in FIG. 2.

DETAILED DESCRIPTION OF THE DRAWINGS

Figure 2:
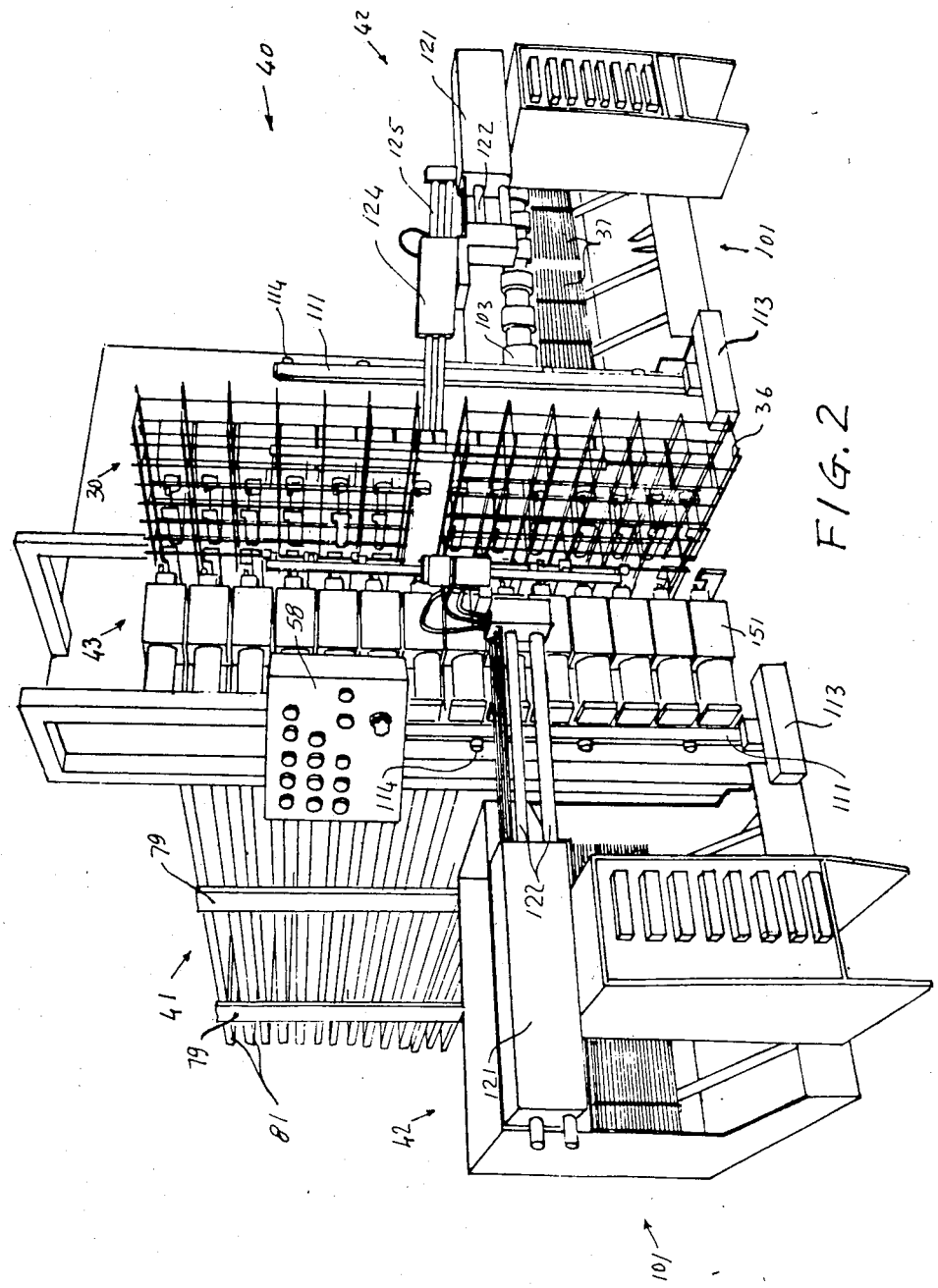
FIG. 2 is a perspective view of an assembly machine as shown in FIG. 1.

The assembling method according to the invention is intended for the manufacture for example, but not exclusively, of three-dimensional metal structures 30 (FIG. 2) of that kind as described in European Patent Application 82102021 published on Sept. 29, 1982. Said method is particularly useful to assemble plane nettings 36 made from steel wires with cross wires 37, and provides preferably for the use of a machine 40 allowing assembling the three-dimensional structure.

The nettings 36 comprise lengthwise wires 34 and brace wires 35 that are connected together by means of a flat welder 38 (FIG. 1) prior to assembling the three dimensional structure 30.

Figure 1:
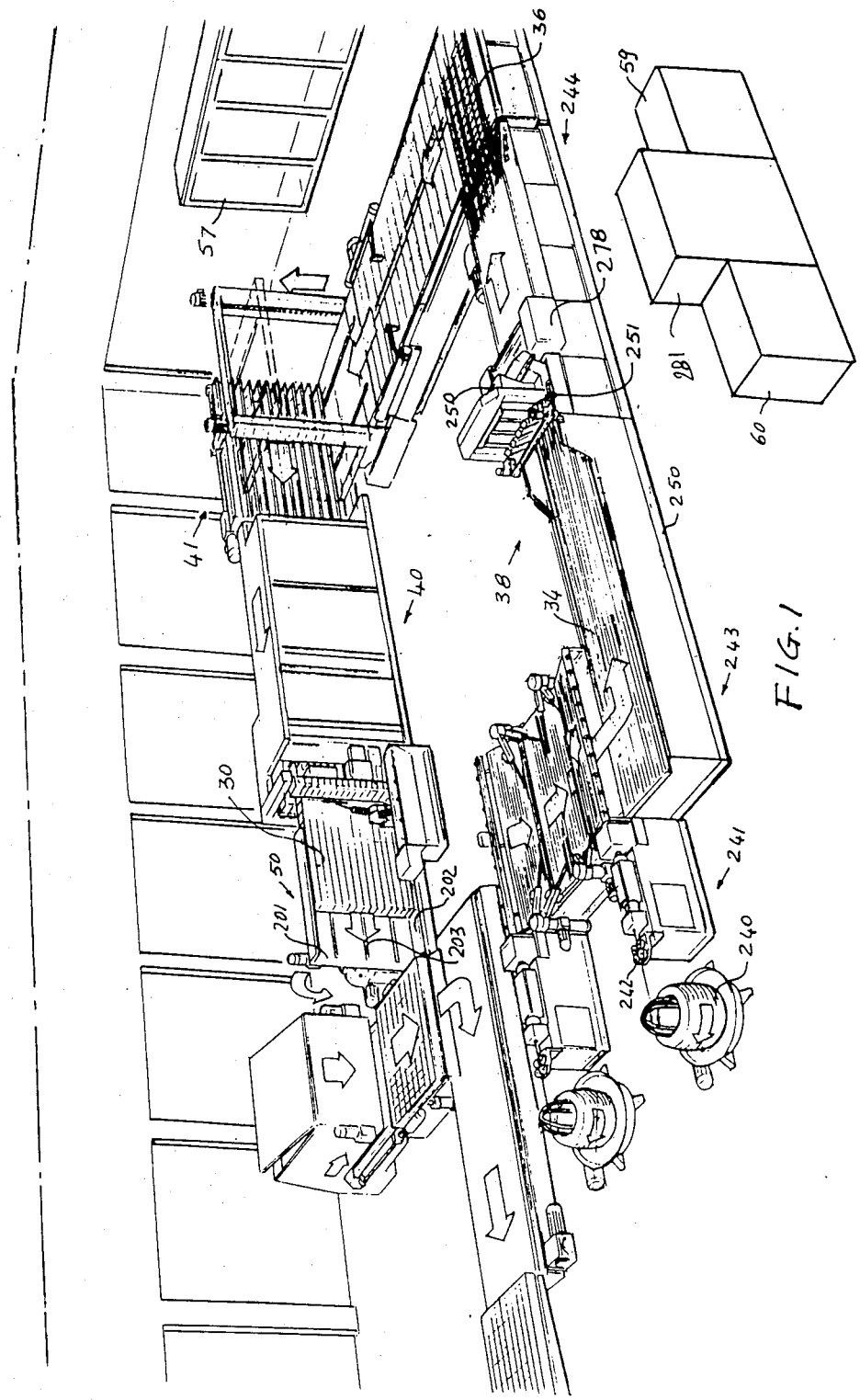
FIG. 1 is a general diagrammatic view of assembly machines being used according to method of the invention.

The assembly machine 40 (FIG. 2) comprises a support structure 41 which bears the nettings 36, a supply group 42 from which the cross wires 37 are taken to be welded to the nettings 36, a series of welding units 43, and a feeding group 45 for said structure 30, during the assembly, and a receiving unit 50 (FIG. 1).

The machine is further provided with an electronic group 57 (FIG. 1) for sequentially controlling the various assembly and welding steps, a control panel 58, an air unit 59 for performing the commands sent by unit 58, and a cooling unit 60 for cooling welding electrodes in the assembly machines 38 and 40.

The following description pertains to the supporting structure.

The supporting structure 41 comprises an upright array 79 on which a series of pairs of cross beams 80 are secured at regular spacings. Said cross beams 80 form a series of horizontal superimposed bearing planes 81. The spacings between the planes 81 are equal to one another and define the cross-wise pitch of the plane nettings 36 relative to the already assembled structure 30.

Figure 3:
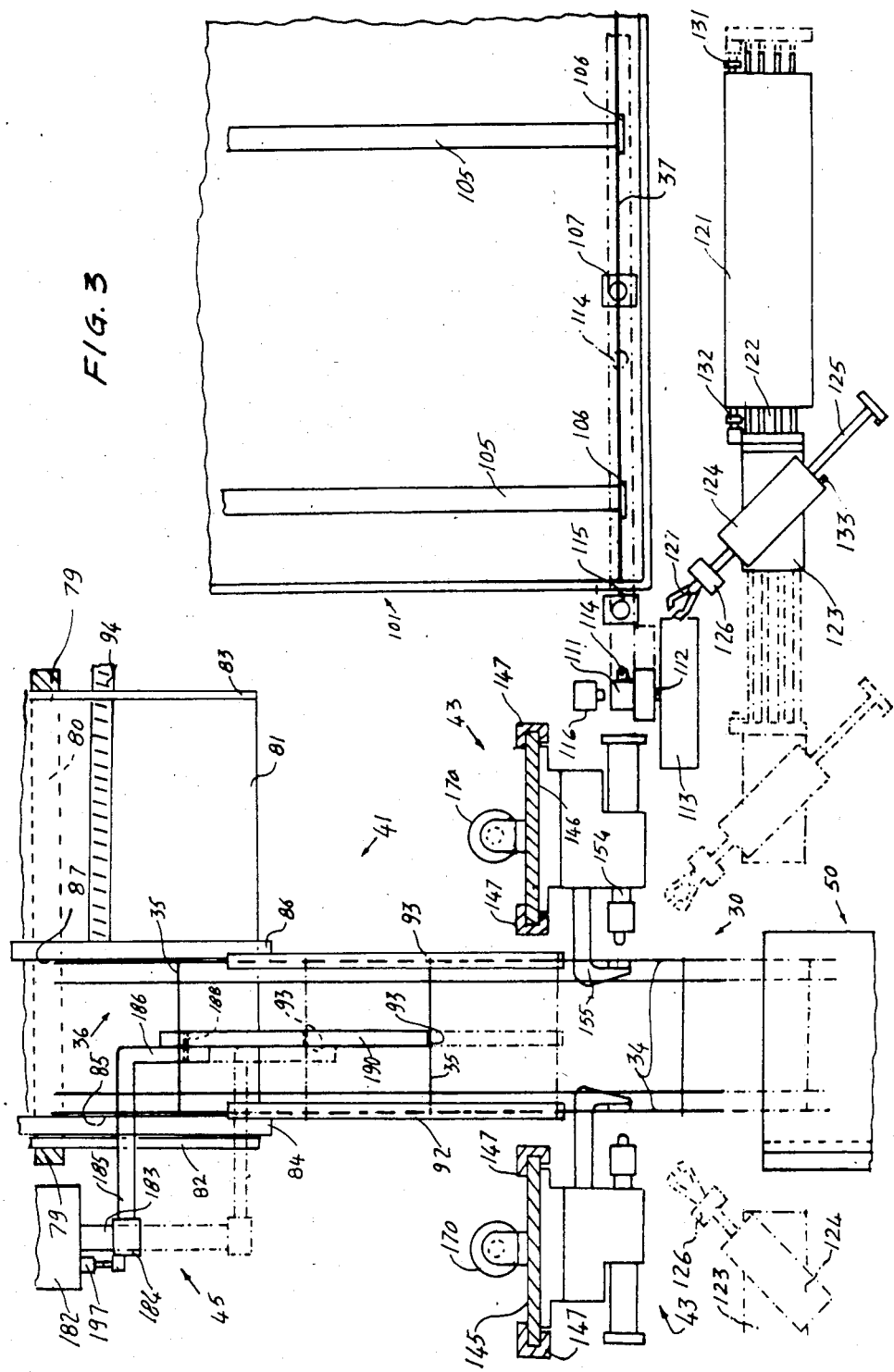
FIG. 3 is a partial plan view of the machine as shown in FIG. 2.

The planes 81 (FIG. 3) have an elongated rectangular shape and are provided with two transverse sides 82 and 83, respectively on the left and right as viewed in FIG. 3, and they bear a corresponding plane netting 36.

A control element 84 comprised of an extruded part with a rectangular cross-section, is secured to each side 82 and is provided with a control surface 85 which can cooperate with the ends, on the left-hand side of the figure, of the brace wires 35 from the nettings 36. The surfaces 85 of the control elements 84 from the various planes 81 are located in the same plane, and define a vertical marking surface which represents a side surface plane for the three-dimensional structure 30.

Another control element 86, also comprised of an extruded part with a rectangular cross-section, is adjustably secured to side 83 of each plane 81, and is provided with a control surface 87 which can cooperate with the ends, on the right-hand side of the figure, of the brace wires 35 from the nettings 36. The surfaces 87 of the control elements 86 lie in the same plane and define another vertical marking surface for the three-dimensional structure 30, with this marking plane being parallel to the side reference plane defined by surfaces 85. Both of these marking planes are designed to being the lengthwise wires 34 in the same plane, on the same side of the various nettings 36, and the marking planes lie at right angle to the planes of nettings 36. As shown in FIG. 3, alignment means such as guide elements 92 and 93 are secured at one end, such as the front end, of control elements 85 and 86. Elements 92 and 93 are formed by extruded parts with a U-shaped cross-section, projecting outside the planes 81. Said elements cooperate with the ends of the brace wires 35 as well as with the lengthwise wires 34 from the plane nettings 36, and they serve to define accurately the vertical marking planes of structure 30 and to prevent warping of the nettings 36 in that area next to the outlet end of the guide elements 92 and 93, adjacent to the welding units 43.

The control elements 87 and guide elements 93 are movable relative to the sides 83, for example by means of screws 94. In such a way, the spacing between the marking planes of the surfaces 87 and guide elements 92 may be changed either relative to the marking plane of surfaces 85, or relative to the guide elements 93, to define accurately the vertical marking planes of different structures 30 using different nettings 36 of different widths.

A supply group follows the supporting structure. Said supply group 42 is divided into two units, each one comprising a hopper 101 (FIG. 11), holding the wires that become brace wires 37. Th wires are pulled by gravity into outlet channel 102 (FIG. 11), and eccentric 103 is provided to facilitate this movement of the wires. A device 104 is provided so that the wires 37 fall one by one, and the wires are guided by slanting rods 105 and stop at the base of said rods 105 by engaging shoulders 106. The presence of wire 37 retained against said shoulders 106, is sensed by a magnetic sensor 107, which conducts on electric signal to control unit 57.

Between support 41 and hoppers 101 (FIG. 3), two gripping arms 111 are provided, each one being formed by a parallelepiped-shaped bar with a bearing point at the one end, and an output shaft 112 of an air driving member 113. Said driving member 113 is provided to rotate the gripping arm from a horizontal position to a vertical position. Each gripping arm 111 in the horizontal position thereof, is substantially aligned with and superimposed on wire 37, which is stopped for the time being against shoulders 106 and adjacent the wire proper. A number of magnets 114 are so arranged as to move the wire 37 away from the shoulders 106 and to retain the wire on arm 111 aligned with the axis of the arm.

Said position of wire 37 relative to arm 111 remains unchanged even when arm 111 lies in a vertical position. Two sensors 115 and 116 are provided to sense, respectively, the horizontal position and the vertical position of said arm 111, and to convey the information to control unit 57.

Facing hopper 101 (FIGS. 2 and 3), two air actuators 121 are arranged, provided with pistons 122 movable in a horizontal plane along a direction at right angle to the marking planes of surfaces 85 and 86. To said pistons 122 are fastened two corresponding support blocks 123 to which are secured in turn two other air actuators 124. Said actuators 124 are provided with pistons 125 which are horizontally movable along a direction slanting at an angle of 45° relative to the marking planes of surfaces 85 and 86. Said pistons 125 include two uprights 126 to which two corresponding series of air-actuated clamps 127 are fastened, which can move the wires 37 away from the arms 111 and retain said wires in parallel relationship with said uprights 126. Sensors 128 are provided to sense the presence of one or a plurality of wires 37 retained by said clamps 127. The supports 123 may be moved away from the pistons 122 from side positions adjacent to the hoppers, to center positions adjacent to the welding units 43 and guide elements 92 and 93. Uprights 126 may in turn be moved away from said pistons 125 from positions removed from hoppers 101 and guide elements 92 and 93 towards areas next to said arms 111 and welding unit 43.

End sensors 131 and 132 for the actuators 121, sense respectively the side and center positions of blocks 123, and end sensors 133 for the actuators 124 sense the positions of uprights 126 adjacent to the arms 111 and welding units 43. Moreover, magnet sensors 134 sense the presence of wires 37 on said uprights 126, as they are retained by clamps 127. The informations from the sensors 134 are also conveyed to control unit 57. Said hoppers 101 are so arranged, with suitable partitioning elements, to each receive two series of cross wires 37, with a length which is slightly shorter than the maximum width of the hopper proper. The slanting rods 105, the gripping arms 111, the uprights 126, the clamps 127, and the various sensors may handle simultaneously two wires 37 aligned and next to one another. This allows the simultaneous assembly of two three-dimensional structures, each of which have a height slightly less than half the height a stucture having the maximum height.

The welding units 43 (FIG. 3) are divided into two groups which are respectively mounted on two plates 145 and 146. Said plates are slidably mounted on vertical uprights 147 which are arranged to the left and right of guide elements 92 and 93, in such a way as to have each pair of elements 92 and 93 be associated with one pair of welding units 43.

Each unit 43 comprises a body 151 in the shape of a hollow parallelepiped, on which a transformer 152, an air actuator 153, a movable electrode 154 and an opposing electrode 155 are mounted.

Figure 5:
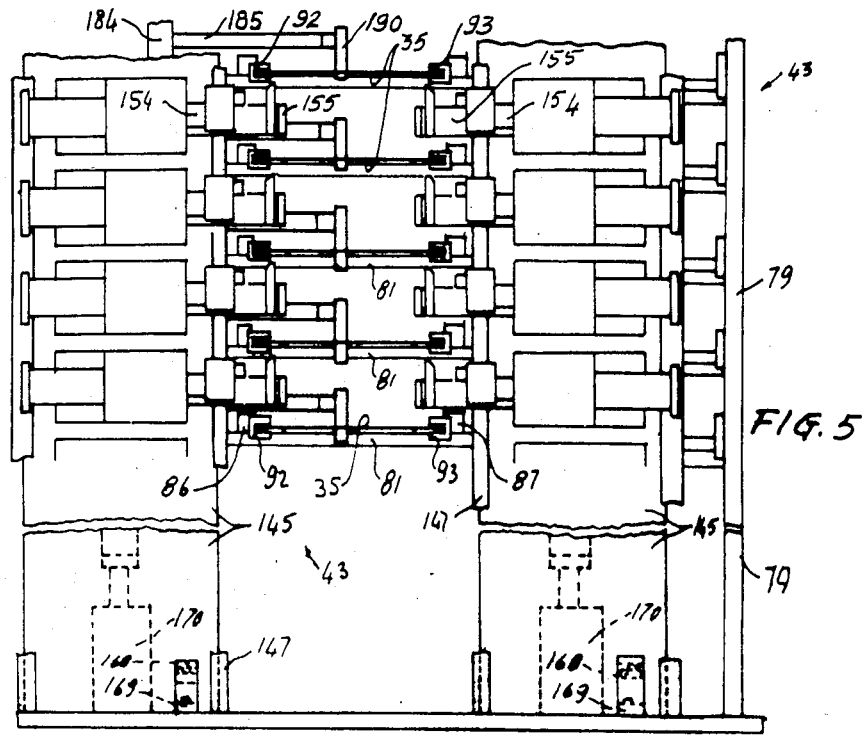
FIG. 5 is a front view of certain details of the machine as shown in FIG. 2.

The movable electrode 154 is secured to a piston 157 from actuator 153 which is in turn guided by sleeves that insulate the piston from body 151. The opposing electrode 155 has an L-shaped body and is electrically connected to body 151. Transformer 152 is fitted partly inside the parallelepiped-shaped body 151 and it is provided with a primary winding the terminals of which may be connected to source of electrical energy. The secondary winding of said transformer is provided with two terminals 159 and 160 connected to electrodes 154 and 155. Terminal 159 is directly connected to electrode 155, while the connection between electrode 154 and terminal 160 is obtained by means of a series of thin copper leaves, bent into a U-shape, which allow the movements of piston 157 relative to said transformer 152. The active portion of each movable electrode 154 (FIG. 5) as shown in 163, is of cylinder shape and lies higher relative to piston 157, said portion being connected thereto by a block 164. The active portion of each electrode 155, shown in 165, is in the shape of a parallelepiped and projects upwards from electrode 155. Inside blocks 164 of electrodes 154 and 155 pass cooling ducts, which are provided with small inlet and outlet openings 166 and 167, connected to the cooling unit 60.

Figure 6:
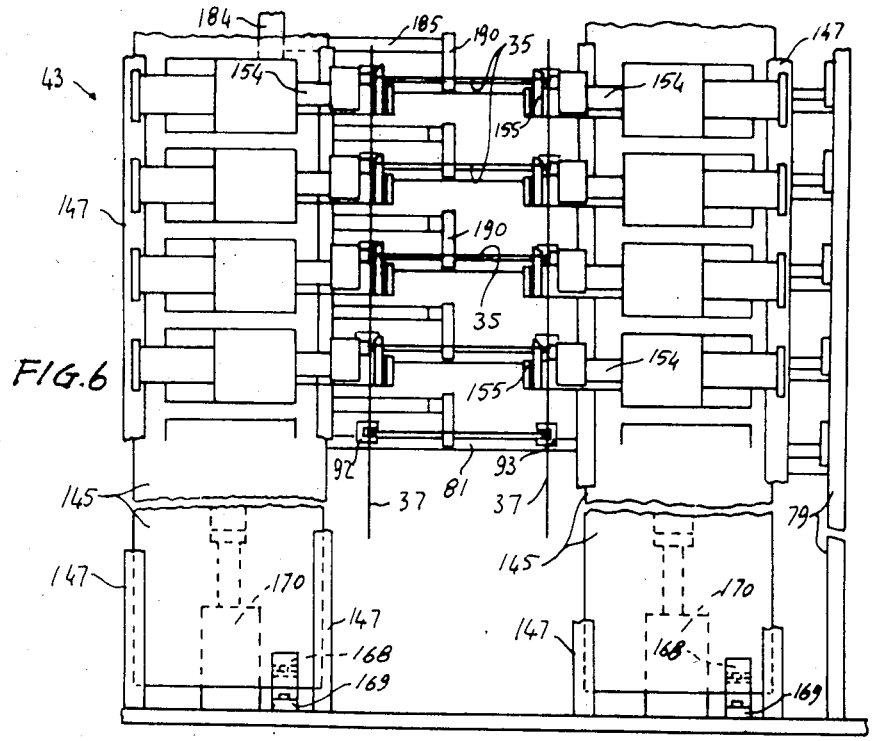
FIG. 6 shows details from FIG. 5, during an operating step.

In rest condition, portions 163 and 165 of units 43 lie underneath the planes of nettings 36, and each plate 145, 146 is vertically movable relative to the uprights 147. An actuator 170 moves the welding units 43 upward to bring portions 163 and 165 in alignment with the planes of nettings 36. Moreover, two end sensors 168 and 169 (FIGS. 5 and 6) may sense respectively the high and low positions of said units 43. In the variation as shown in FIGS. 12 and 13, the welding units 43 are mounted on two fixed plates 180. Each opposing electrode shown in 171, is provided with a lever arm 173 and swings about a sleeve 172 in parallel relationship with piston 157. The active portions 163 of said movable electrodes 154 are lined up with the planes of the various nettings 36, while the active portions of electrodes 171 lie underneath said planes. The arms 173 swing absent a single vertical link 174, which is in turn connected to an air actuator 175.

The actuator 175 is so designed as to swing the active portions 164 into alignment with the planes of nettings 36. The sensors 168 and 169 sense in such a case, the respective high and low positions of said electrodes 171.

Figure 7:
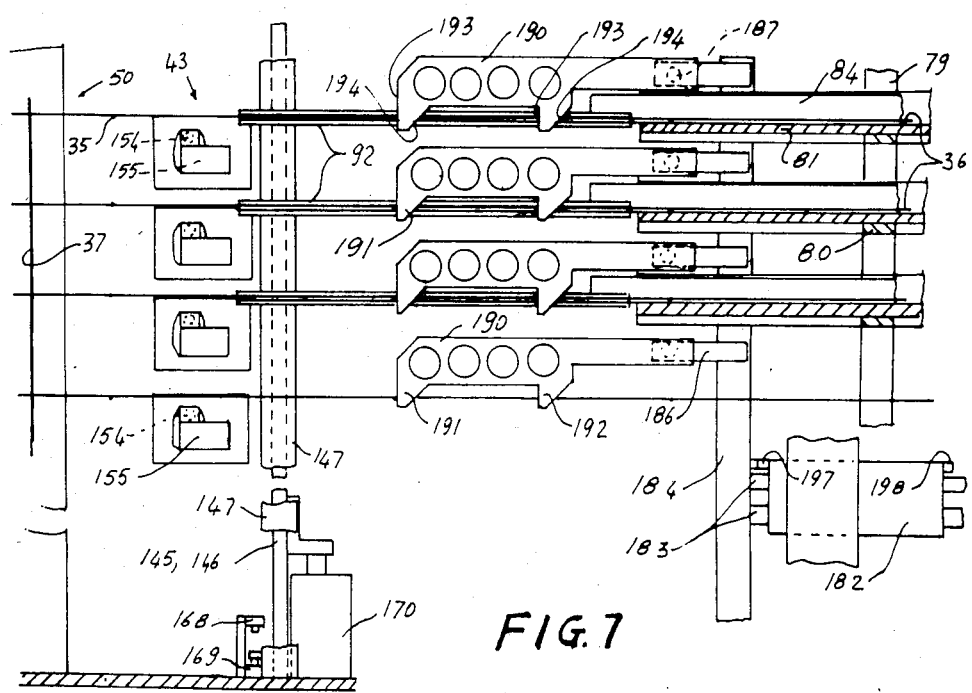
FIG. 7 is a side view of elements of the machine as shown in FIG. 2.

Assembly 45, the so-called feeding assembly (FIGS. 3 and 7), comprises an air actuator 182 provided with two pistons 183 which are movable in parallel relationship with said guide elements 92 and 93. On said pistons 183, a vertical rod 184 is mounted, to which L-shaped horizontal arms 185 are fastened and arranged in the space lying between the planes of nettings 36. Said arms 185 have a lengthwise portion 186 lying in the mean plane between the vertical marking planes defined by said guide elements 92 and 93.

On each portion 186, by means of a pivot 187, a toothed lever 190 swings, which is provided at the bottom with a front tooth 191 and a back tooth 192. In a rest position, said lever is retained in horizontal position by gravity and against the action of a stop element 188 depending from said portion 186. Each tooth 191, 192 comprises in the front portion thereof, a corresponding substantially vertical engagement edge 193, and in the back portion thereof, a slanting edge 194. The engagement edges 193 of teeth 191 and 192 are aligned among them on two vertical planes the spacing of which is slightly wider (by about 1 mm for wires from 0.6–0.7 mm) than half the pitch of brace wires 35 and nettings 36. The actuator 182 is so designed as to move the rod 184 and thus levers 190 over a distance equal to half the pitch of said brace wires 35. A pair of end sensors 197 and 196 sense the end limits of the stroke and conveys the informations to said control unit 57. The control edges 193 are designed to cooperate with said brace wires 35 to move the nettings 36 together, while retaining the same plane for the brace wires in the various nettings 36, either before the assembly of structure 30, or during the movement of nettings 36, during the welding operations.

More particularly in the rest position, the control edges 193 of teeth 191 or 192 lie adjacent and behind the brace wires 35 of nettings 36. Consequently, during a forward movement of said pistons 183, the edges 193 of teeth 191 or teeth 192, from levers 190 more the nettings 36 towards the front part of the machine, and this is done over a stoke equal to half the pitch of the brace wires 35.

During the return stroke, the brace wires 35 engage the slanting edges 194, causing the toothed levers 190 to raise, so that those levers may return to a position with the edges 193 behind the brace wires 35 for a new feeding of the nettings 36. During both forwards and backwards movement of levers 190, the teeth 191 and 192 act but once, but on one and the same brace wire 35. There is thus obtained for the cross wires 37 are spaced apart a pitch which is substantially equal to half the pitch of the brace wires 35 in the already assembled structure 30.

With reference to FIG. 1, it will be noted that the receiving unit 50 comprises a reversing plane 201 provided with a base 202 for collecting the already assembled structure, and at least one area 203 which can receive a bracket for a second structure, when the assembly machine 40 assemblies simultaneously two structures with a reduced height.

Figure 16:
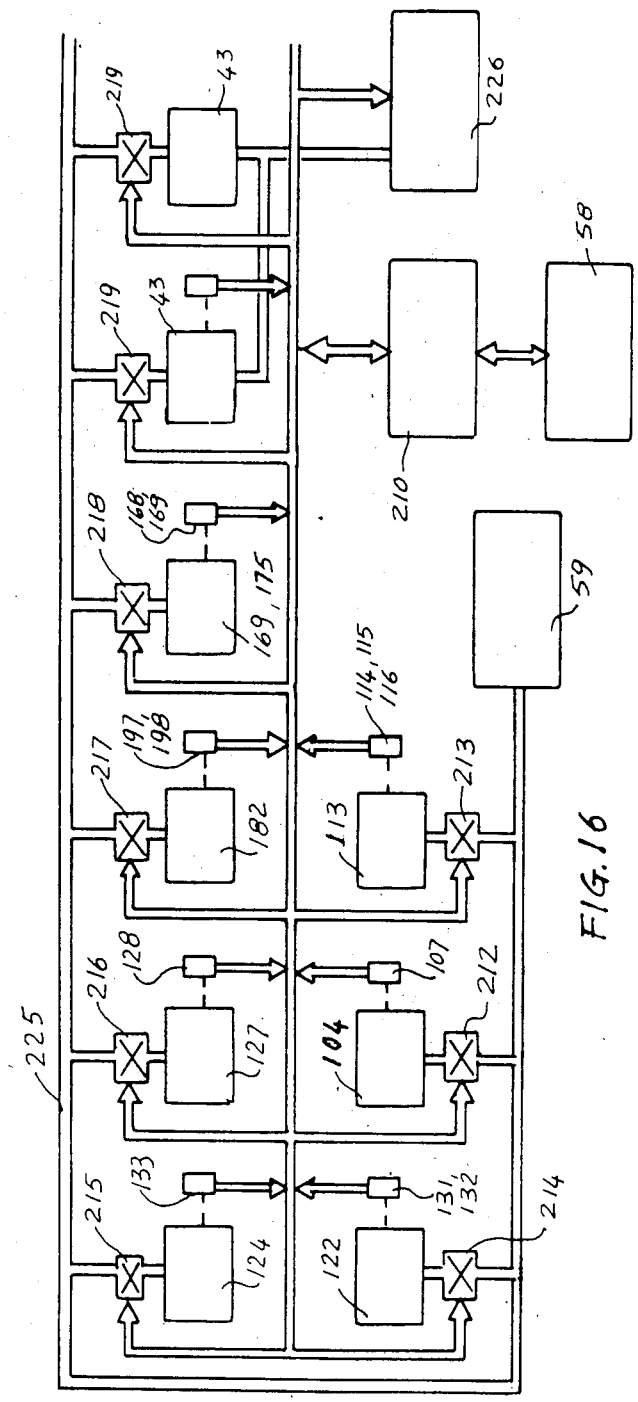
FIG. 16 shows a schematic diagram of the complete machine as shown in FIG. 2.

Unit 57, the so-called control unit 57, comprises a microprocessor 210 (FIG. 16) provided with a series of input-output interface units. The input interfaces receive the data from the sensors sensing the presence of wires and the sensors sensing the stroke end of the actuators; the output interface units are connected to relays, possibly to solid-state switches which control the opening or closing of valves 212–219, arranged between the pressurized air circuit 225 from air unit 59, and actuators 104, 113, 122, 124, 127, 182, 169 or 175, respectively, as well as all the actuators 153 of welding units 43.

The microprocessor is provided to operate a power unit 226 which is connected to the the source of electrical energy, the primary windings of transformers 152 in units 43. The microprocessor 210 is provided with a programme which controls the performance the various electro-valves in a pre-determined sequence and depending on the condition of the various sensors. Said microprocessor is moreover connected to a series of adjustment members to allow for a variation in the same intervals of the weldings.

Figure 20:
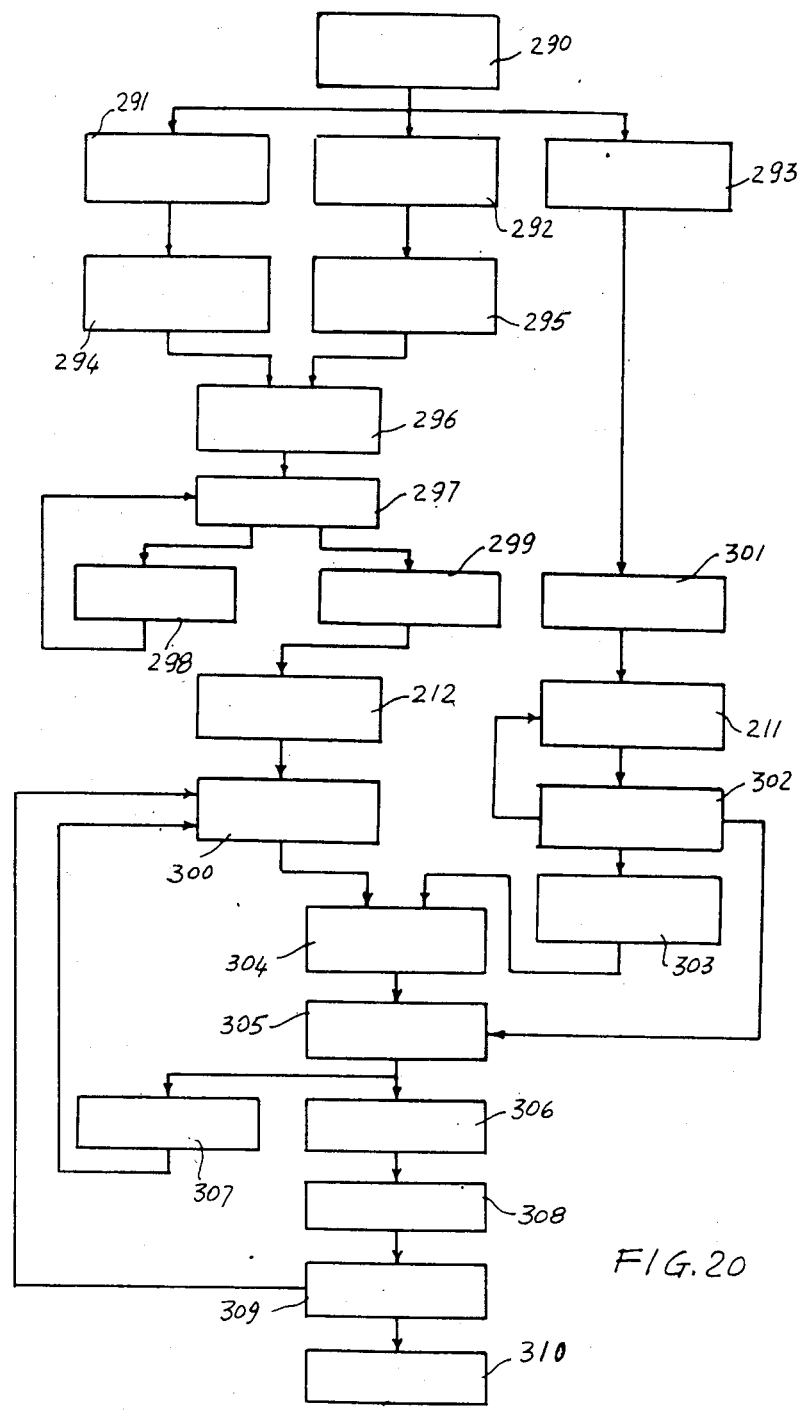
FIG. 20 is a general schematic diagram of the operations provided with the method according to the invention.

The assembling method is shown diagrammatically in FIG. 20, and at steps 211 and 212, the wires 37 are collected from hoppers 101 and the nettings 36 (FIG. 3) are positioned on the bearings planes 81. The lengthwise wires 34 are thus engaged in the various guide elements 92 and 93, until brace wires 35 from the first series lie in front of the control edges 193 of teeth 191.

The machine 40 is so designed as to work with two wires 37, or four wires in the case where two structures are being assembled, which wires are already positioned on the arms 111 and this in a vertical position. The blocks 123 lie in the respective sidewise positions and the uprights are removed from the arms 111. At this stage, control unit 57 is ready to start assembling the structure 30. By pressing the start key, the actuators 182 are started, which move the respective levers 190 in the direction of the machine front part, thus causing the not yet assembled nettings 36 to be moved simultaneously. Consequently, as the brace wires 35 from the first series are suitably located in one and the same plane, the lengthwise wires 34 are brought to the respective welding areas.

After moving forwards the nettings 36 are sensed by sensors 198, said control unit 57 operates the actuators 124 to bring the uprights 126 adjacent arms 111. Said unit 57 controls the closing of clamps 127 on wires 37, and the transfer of the wires to uprights 126. This condition having been sensed, said unit 57 provides for the operation on the opposite side, of actuators 124, by moving away the uprights 126, and thus the wires, away from said arms 111. Unit 57 starts the actuators 121 working to move the supporting blocks 123 towards the welding area.

Said control unit 57 after sensing by means of sensors 131, the new position of the elements, again operates the actuators 124 (FIG. 14), to bring the wires 37 directly adjacent the lengthwise wires 34. As the pistons 125 move at an angle of 45° relative to the electrode axes and wires 34, the wires 37 and uprights 126 may move freely without hampering said parts. The new position of wires 37 is sensed by sensors 133. Said unit 57 causes at this stage, raising of plates 145 and 146, as well as of all the welding units 43, or the vertical links 174 (FIG. 13) with the single electrodes 171, until the active electrode portions 163 and 165 (FIG. 5) are lined up with the lengthwise wires 34 and lie co-axial with the crossing areas of the cross wires 37 and lengthwise wires 34. Said unit 57 further provides for the working of the actuators 113 to bring the arms 111 to a horizontal position, to collect another pair of wires 37 (or four wires in the case of two structures) from hoppers 101.

During the following step, said unit 57 provides for the control of all the actuators 153 in all the welding units 43. Consequently, the movable electrodes 154 bring the crossed wires 34 and 37 into engagement with respective opposing electrodes. Said unit 57 thus provides for the powering of the primary windings of transformers 152 and the welding of said wires 34 and 37 in the respective crossing areas. While the electrodes are still retaining the wires 34 and 37, unit 57 starts the actuators 182 for a return stroke towards the back machine part. The levers 190 are thus brought backwards and the back teeth 192 thereof, project slightly rearward of the brace wires 35 of the second series. The new position of said levers 190 having been sensed with the sensors 197, said unit 57 causes the opening of the electrodes and clamps, and causes the actuators 180 or 175 to move in the opposite direction, to remove the electrodes from the path of the brace wires 35. Said unit 57 also returns the arms 111 to the vertical position. Finally, unit 57 removes the uprights 126 and blocks 123 from the welding area, thus returning the machine to the original position thereof.

Figure 4:
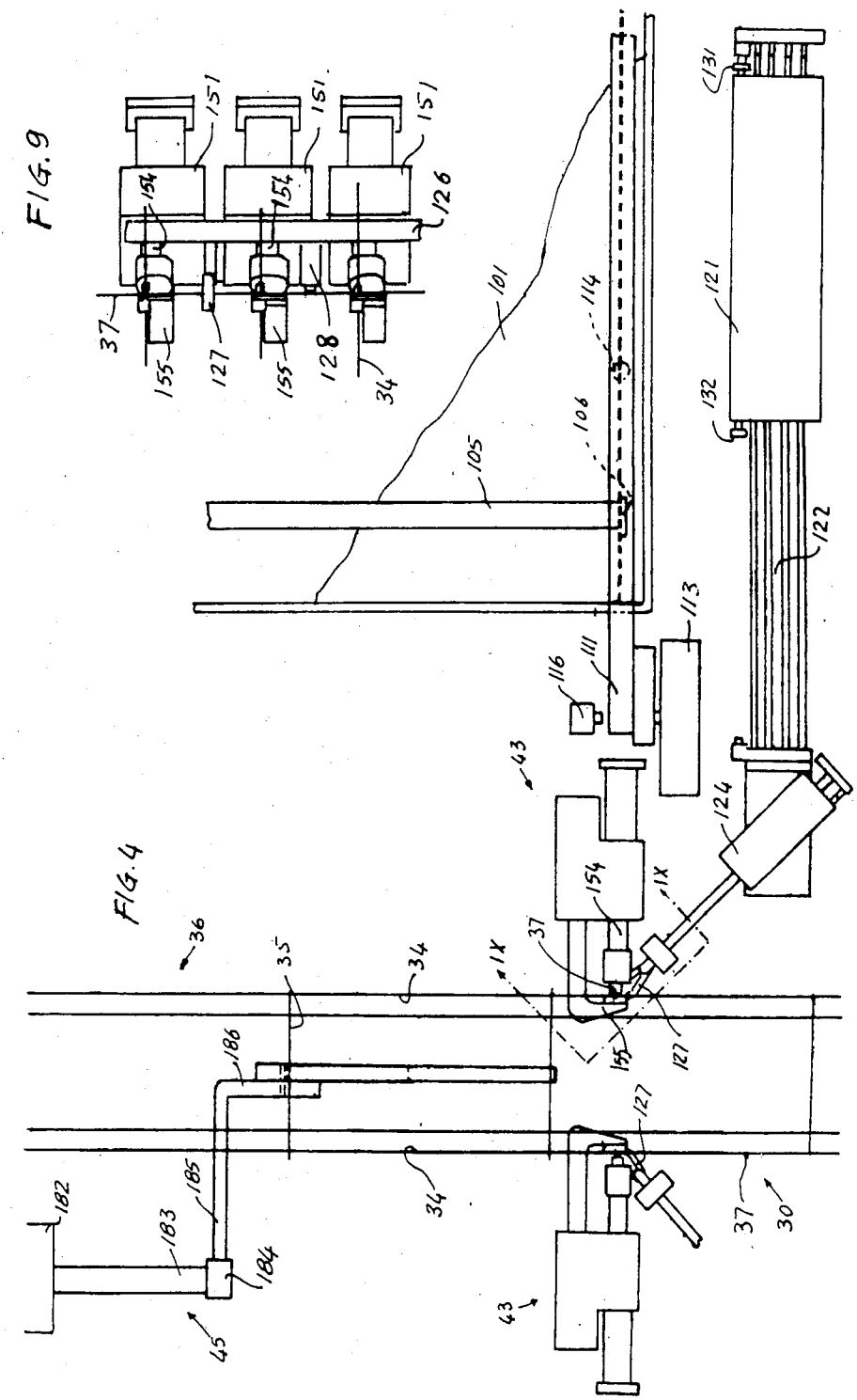
FIG. 4 is a side view of the machine as shown in FIG. 3, in working condition.
Figure 8:
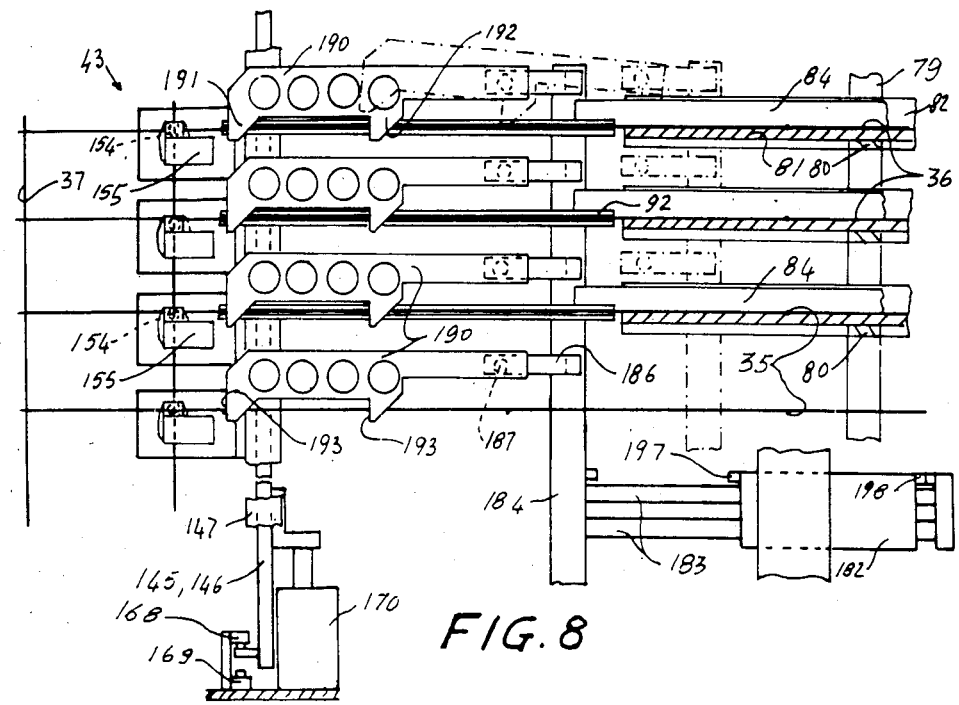
FIG. 8 shows details from FIG. 7, during an operating step.

FIG. 3 shows in dot-and-dash lines, the position of blocks 123 adjacent the welding area, the clamps 127 being shown open and away from the welding area. The extension positions of toothed levers 190 and nettings 36 are shown in the say way. FIG. 4 shows the position of actuators 121 and 124 for the welding step, the wires 35 being aligned by toothed levers 190. FIG. 8 shows the positions of the units 43 during the welding step, and in dot-and-dash lines, that step where teeth 192 are pulled rearward over wires 35.

FIG. 15 shows diagrammatically, relative to time, the flow of welding current 221, the movement of the movable electrodes 154 relative to the opposing electrodes 157 or 171, and the movement of units 43 or electrodes 171. Said diagram also shows the movements of clamps 127, actuators 122 and 123, wire 37 on arms 105, as well as the movements of arms 111.

The following description relates to the plane assembling machine.

The lengthwise wires 34 before welding thereof to brace wires 35, are unwound from drums 240 (FIG. 1) with high capacity, and they are first straightened by means of a wire-straightening machine 241. Said known machine will not be further detailed here. It is generally provided with a series of straightening rollers and counter-rollers 242 which straighten the wires.

During the straightening, the wires are stiffened under the action of the unwinding and distortions due to the twisting imparted during said step.

Figure 17:
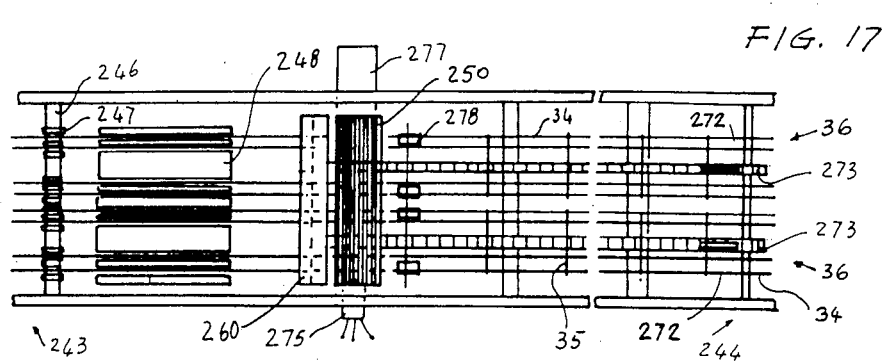
FIG. 17 is a diagrammatic plan view of a second machine of the assembly shown in FIG. 1.
Figure 18:
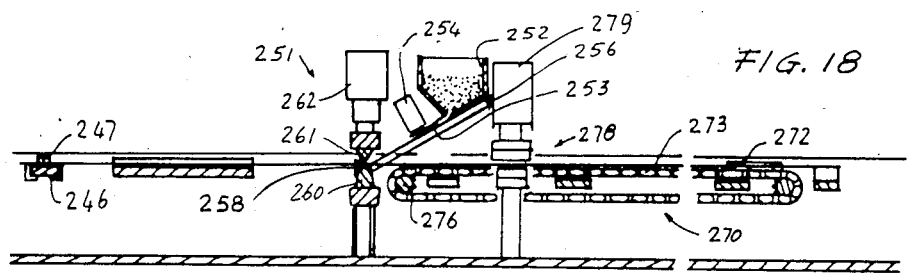
FIG. 18 is a diagrammatic side view of the machine as shown in FIG. 17.

The assembly machine 38 for the nettings 36 comprises an elongated frame 245 with an inlet area and an outlet area 244. The frame 245 (FIG. 17) is provided with a series of cross-beams 246 which can retain the lengthwise wires 34. Said lengthwise wires 34 are in turn retained summarily at predetermined mutual spacings by suitable guides 247 which are movable along said cross-beams. In the middle area of said frame 245, carefully positioned alignment holders 246 are moreover provided, which have such a length that the lengthwise wires 34 will come to lie in substantially parallel relationship with one another in a marking area next to the holder area proper. The wires 34 lie substantially in the same plane; the mutual spacing between the wires proper is thus very accurate and has very high tolerances relative to the project objectives. Next to the outlet area from the holders 248, there have been provided a device 250 for supplying brace wires 35, and a welding unit 251 (FIG. 18). Said device 250 is so designed as to arrange each brace wire 35 in such a way as to cross the lengthwise wires 34 in parallel relationship with one another, so that each lengthwise wire be as near as possible to or in engagement with the wires 34 in the marking section thereof. Said device 250 (FIG. 18) particularly comprises a hopper 252 provided with an outlet channel 253 which is controlled by an actuator 254, a plurality of slanting bars 256, and a series of small stop flanges 258.

The welding unit 251 comprises a fixed electrode 260, lying slightly below wires 34 and cross-wire to the wires in the marking area thereof, and an array of movable electrodes 261. The active portion of said electrodes 261 lies in substantially parallel relationship with the active portion of said electrode 260, and said electrodes 261 are so designed as to move vertically relative to electrode 260 under the action of the corresponding actuators 262. Said electrodes 261 with the downward movement thereof, are so designed as to cooperate with a brace wire 35 and push same against the lengthwise wires 34 which are in turn stopped by the fixed electrode 260 in the respective crossing areas for the sequence welding of wires 34 and 35. The machine 38 further comprises a feeding member 270 which can feed the lengthwise wires relative to electrodes 260 and 261 over a distance which is accurately equal to the brace wire pitch. Said device comprises cross-wise teeth 272 moved by a chain 273 and which can engage the brace wires 35 after welding thereof. The stroke of said teeth 272 is carefully controlled by an extension coder 275 which measures accurately the angle displacements of a shaft 276 on which is secured a gear wheel cooperating with chain 271. Said chain is moved in turn by a servomechanism comprising a motor 277 which is controlled by said extension coder according to a programme which is synchronized with the movement of said electrodes 261 and the wire welding. Downstream of device 250, a cutting device 278 is provided, which is operated by an air-control member 279 and comprises shears which can accurately cut said brace wire 35 adjacent the welding areas with the end lengthwise wires 34 lying outside the netting. The nettings proper will thus have very accurate sizes, which then allows the accurate assembling operations for structure 30 on machine 40.

Figure 19:
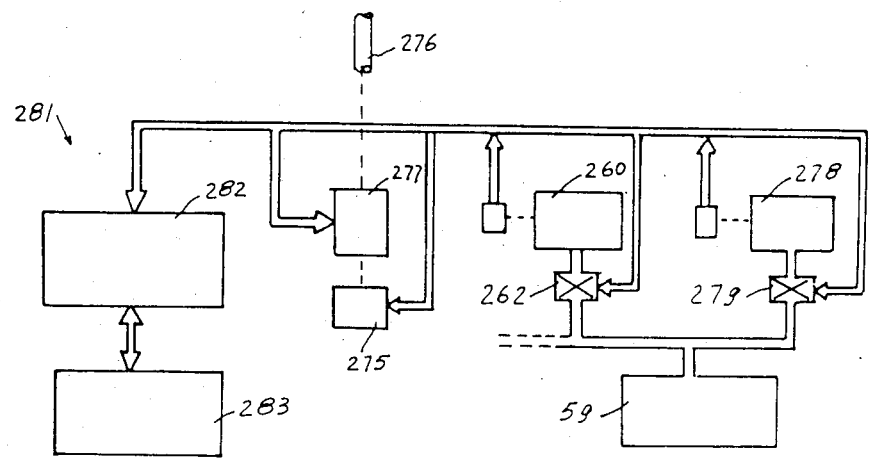
FIG. 19 is a schematic diagram of the machine as shown in FIG. 17.

The machine 38 may be employed assemble simultaneously a plurality of nettings. Said operation is performed by using a single brace wire for a plurality of which have their end lengthwise wires located side to side and joined by a single brace wire nettings. Said nettings are then separated during the same cutting step which follows the welding by cutting the brace wire between the end lengthwise wires adjacent to their welding areas. The various steps for feeding the nettings, welding and cutting are controlled from a control unit 281 which comprises a microprocessor 282 (FIG. 19) and a control panel 283. The various working steps, the feeding step and the welding times may be programmed and synchronized on said microprocessor. FIG. 20 summarizes the various assembling steps for structure 30.

During step 290, welding and twisting of wires 34, 35 and 37 is performed, and these wires will be cut respectively in steps 291, 292 and 293. During steps 294 and 295, respectively, the wires 34 are located on holders 246 of machine 38, and the wires 35 are located on the suitable hopper 252. The wires 34 and 35 are welded in step 296 and then cut in step 297. Thereafter, while cross-wise teeth 272 return to the welding area during step 298, the nettings may be collected in step 299 and arranged on the bearing planes 81 of assembling machine 40. The cross wires 37 will be collected in turn in hoppers 101 during step 211. There then occurs the assembling step of structure 30 which provides for the stepwise feeding of the cross wires during step 300, while the actuator 104 and arms 111 have located wire 37 in middle position during step 303.

There then follows the raising of the electrodes in step 305, the welding in step 306, and the return of levers 190 in step 307. The command to lower the electrodes is then given in step 309, and the collecting on body 50 of the assembled structure, occurs in step 310.

We claim:

1. Method for assembling three-dimensional wire structures, comprising plane nettings and a plurality of pairs of cross wires, for use with a pair of welding units, each welding unit having a plurality of pairs of electrodes to weld a cross wire with the nettings, said method comprising the steps:
    (a) providing a series of support holders defining a series of parallel support planes spaced from one another a preset netting pitch distance, and including alignment means defining an alignment plane perpendicular to said parallel support planes;
    (b) providing a plurality of feeding teeth associated with said support holders and connected with a teeth actuator, wherein said teeth actuator shifts each feeding tooth along a trajectory intersecting one of the parallel support planes and wherein each feeding tooth has at least one control edge, the control edges being aligned on a movable plane perpendicular to said support planes;

(c) providing a series of said plane nettings, wherein each netting comprises a pair of lengthwise wires and a plurality of brace wires welded to the pair of lengthwise wires, the brace wires of each netting being spaced apart a preset brace wire pitch distance;

(d) positioning each of said series of nettings on a corresponding support holder of said series of support holders such that at least one of said pair of lengthwise wires of each of said series of nettings is parallel to said alignment plane and coplanar with at least one of said pair of lengthwise wires of each of the others of the series of nettings;

(e) actuating said teeth actuator to engage the control edges of said feeding teeth against a first group of brace wires and to shift the nettings along said parallel support planes to a first given position, with said first group of brace wires coplanar and defining a first bearing plane;

(f) arranging a pair of cross wires to cross the lengthwise wires of the series of nettings in crossing areas;

(g) actuating the pair of welding units for welding said pair of cross wires with the series of nettings;

(h) actuating said teeth actuator to engage the control edges of said feeding teeth against a second group of brace wires, to shift said series of nettings along the parallel support planes a preset cross wire pitch distance to a second given position, with the second group of brace wires coplanar and defining a second bearing plane; and (i) repeating the steps (f) to (h) until the plurality of pairs of cross wires have been welded to the lengthwise wires of said series of nettings.

2. Method as defined in claim 1, wherein each of said brace wires has a pair of ends adjacent to the lengthwise wires and defining the width of each netting, and wherein said alignment means comprise a pair of shoulder elements configured to slidably cooperate with the ends of the brace wires of said series of nettings.

3. Method as defined in claim 1, wherein said three-dimensional structures are manufactured in pairs by welding two pairs of cross wires to two groups of series of nettings, and each cross wire pair is welded to a one of said groups of nettings.

4. Method as defined in claim 1, in which said nettings are manufactured by performing the following steps:

(a) arranging a group of lengthwise wires parallel to one another and spaced apart from one another a pre-determined distance;

(b) arranging a brace wire in a position on the group of lengthwise wires, said brace wire crossing the group of lengthwise wires at right angles thereto;

(c) welding the lengthwise wires to said brace wire;

(d) moving said lengthwise wires a preset brace wire pitch distance;

(e) arranging another brace wire in another position on the group of lengthwise wires, said another brace wire crossing the group of lengthwise wires at right angles thereto, and welding said another brace wire to said group of lengthwise wires;

(f) repeating steps (d) to (e) until a netting is made.

5. Method as defined in claim 4, which further comprises an additional step of cutting the adjacent portion of said brace wires, which portion lies outside the end lengthwise wires, to define accurately the width of the netting.

6. Method as defined in claim 1, in which said support holders are arranged along horizontal planes, and the step of arranging the pairs of cross wires includes the step of arranging the pairs of the cross wires in substantially vertical planes.

7. In a machine for assembling three-dimensional wire structures of the type including a series of plane nettings welded with cross wires, wherein each netting has two external lengthwise wires, and the machine comprises a pair of welding units, each welding unit having a plurality of pairs of electrodes operable for welding a cross wire with the nettings in corresponding crossing areas, the combination comprising:

(a) a series of support holders for holding a series of said nettings on parallel support planes spaced from one another a given netting pitch distance, and including alignment means for holding the external lengthwise wires of at least one side of the series of said nettings substantially coplanar, in a first side reference plane, perpendicular to said parallel support planes, wherein each one of said nettings comprises a plurality of brace wires welded to the external lengthwise wires of the netting and spaced apart a given brace wire pitch distance;

(b) a netting feed mechanism having a plurality of feeding teeth and a teeth actuator connected with the feeding teeth and operable to move each feeding tooth along a path intersecting with a brace wire of each corresponding netting to shift said corresponding netting a given cross wire pitch distance along the support holders and the alignment means, and to position a first group of brace wires of the series of said nettings in a first bearing plane;

(c) a positioning device operable for arranging a pair of said cross wires at the sides of said nettings adjacent to the welding electrodes and in predetermined positions with respect to the brace wires; and (d) an electronic control unit controlling said teeth actuator for shifting the series of said nettings to move the feeding teeth a given cross wire pitch distance, and to hold a second group of the brace wires coplanar in a second bearing plane after the welding of said pair of cross wires to the nettings.

8. Machine as defined in claim 7, wherein the positioning device comprises a pair of lengthwise members, each lengthwise member having gripping elements for the cross wires and an actuator to move the lengthwise member and a cross wire engaged thereby, along a path from a position parallel to the support planes and to one of the predetermined positions at one of the sides of the nettings.

9. Machine as defined in claim 7, in which said support holders comprise bearing planes for said nettings and the alignment means includes a pair of end guides with a U-shaped cross-section to locate accurately said lengthwise wires in an area next to the electrodes.

10. Machine as defined in claim 9, wherein said alignment means comprises first and second series of guide elements, the first series of guide elements slidably cooperating with the one side of the nettings and defining the first reference plane, and the second series of guide elements slidably cooperating with a second side of the nettings and defining a second reference plane parallel to the first reference plane.

11. Machine as defined in claim 7, further comprising at least one cross wire magazine containing unassembled cross wires at one side of the series of nettings, and wherein the positioning device comprises an arm member having gripping elements engageable with a cross wire stored in the magazine and an intermediate actuator connected with the arm member and operable to move the arm member from the magazine and to an area parallel to the one side of the series of the nettings.

12. Machine as defined in claim 7, wherein the netting feed mechanism further comprises a common lengthwise member connected with the teeth actuator to move the teeth actuator along forward and backward strokes parallel to the lengthwise wires of the nettings, wherein each feeding tooth has a first engagement edge and a first slanting edge, is pivotally supported on the common lengthwise member and is normally held in an active position, wherein the engagement edge of the feeding tooth is engageable with one of the brace wires along the forward stroke of the common member for feeding the nettings the cross wire pitch distance, and wherein said slanted edge is engageable by a brace wire rearward of said one of the brace wires to pivot the tooth to an inoperative position, without shifting the nettings, for positioning the tooth behind the following brace wire during the backward stroke of the teeth actuator.

13. Machine according to claim 12, wherein each feeding tooth further comprises a second engagement edge and a second slanted edge, wherein the distance between the first and the second engagement edges of each feeding tooth is substantially half the brace wire pitch distance, and the length of the forward and the backward strokes of the common lengthwise member are substantially half the brace wire pitch distance and substantially equal or slightly longer than the cross wire pitch distance.

14. Machine as defined in claim 7, wherein said alignment means comprises a first series of fixed guide elements which define said first side reference plane, further comprising a second series of movable guide elements defining a second side reference plane substantially parallel with said one reference plane, and a control member to movably connect together said movable guide elements for guiding series of nettings with different widths.

15. Machine as defined in claim 8, in which said alignment means includes first and second guide elements that may be spaced apart at various distances for guiding nettings with different widths.

16. Machine as defined in claim 7, in which said alignment means comprises a series of shoulders lying substantially in the same plane, which can cooperate with said brace wires to define the bearing planes of said structure.

17. Machine as defined in claim 7, in which said positioning device moves the cross wires from a supply area to the area crossing said lengthwise wires of said nettings.

18. Machine as defined in claim 17, in which the supply area lies on the one side of said netting series, and said positioning device lays said cross wires in parallel relationship with the bearing plane defined by said brace wires.

19. Machine as defined in claim 17, in which the positioning device comprises a hinged arm provided with gripping elements for the cross wire, and an arm actuator which moves the hinged arm to move said cross wires from the supply area to the welding area.

20. Machine as defined in claim 19, in which said arm actuator moves said arm along a slanting direction relative to the first side reference plane and the first and second bearing planes.

21. Machine as defined in claim 19, in which the arm actuator moves said arm along a direction at a right angle to the first side reference plane.

22. Machine as defined in claim 19, in which the arm actuator is an air actuator.

23. Apparatus for assembling three-dimensional wire structures of the type including a series of plane nettings welded to a plurality of cross wires, each netting including first and second longitudinally extending wires and a plurality of brace wires connected to and transversely extending between said longitudinally extending wires, the apparatus comprising:
  support means defining a series of parallel netting support planes to support said series of plane nettings, the support means including alignment means to hold the first longitudinally extending wires of the plane nettings coplanar in a first side plane perpindicular to the support planes;
  netting feed means connected to the support means, and including a plurality of feeding teeth, each feeding tooth supported for reciprocating movement along a path intersecting one of the netting support planes, to advance the plane nettings along the netting support planes;
  positioning means located adjacent the support means to position a plurality of first cross wires across and in engagement with the first longitudinally extending wires of the plane nettings, and to position a plurality of second cross wires across and in engagement with the second longitudinally extending wires of the plane nettings;
  a first welding unit located adjacent a first side of the netting support planes to weld the first cross wires to said first longitudinally extending wires;
  a second welding unit located adjacent a second side of the netting support planes to weld the second cross wires to said second longitudinally extending wires; and
  control means connected to the netting feed means, the positioning means and the first and second welding units; and actuating the netting feed means to advance the plane nettings along the metting support planes through a sequence of positions, and for each of the sequence of positions of the plane nettings
  (i) actuating the positioning means to position a different one of the first cross wires across and in engagement with the first longitudinally extending wires of the plane nettings, and to position a different one of the second cross wires across and in engagement with the second longitudinally extending wires of the plane nettings,
  (ii) actuating the first welding unit to weld said different one of the first cross wires to said first longitudinally extending wires, and
  (iii) actuating the second welding unit to weld said different one of the second cross wires to said second longitudinally extending wires.

24. Apparatus according to claim 23 wherein the positiong means includes:
  a first hopper to hold the first cross wires;
  a first arm to grip and to carry the first cross wires from the first hopper; and
  first transport means to move the first arm between a position adjacent the first hopper and a position adjacent the netting support planes, to carry said first cross wires into engagement with the first longitudinally extending wires of the plane nettings.

* * * * *

UNITED STATES PATENT AND TRADEMARK OFFICE
CERTIFICATE OF CORRECTION

PATENT NO. : 4,667,707
DATED : May 26, 1987
INVENTOR(S) : Andre DeSchutter, et al.

It is certified that error appears in the above-identified patent and that said Letters Patent is hereby corrected as shown below:

IN THE SPECIFICATION:

Column 1, line 14: "mode" should read as --made--

Column 1, line 34: "particularly as with" should read as --particularly with--

Column 1, line 43: "invention, comprises" should read as --invention comprises--

Column 2, line 18: "making" should read as --marking--

Column 4, line 13: "being" should read as --bring--

Column 5, line 25: "unit 43" should read as --units 43--

Column 6, line 28: "absent" should read as --about--

UNITED STATES PATENT AND TRADEMARK OFFICE
CERTIFICATE OF CORRECTION

PATENT NO. : 4,667,707

DATED : May 26, 1987

INVENTOR(S) : Andre DeSchutter, et al.

It is certified that error appears in the above-identified patent and that said Letters Patent is hereby corrected as shown below:

Column 7, line 5: "more" should read as --move--

Column 7, line 15: "act but once, but on one and the same" should read as --act only once and on the same--

Column 7, line 16: "There is thus obtained for the cross" should read as --Consequently, the cross--

Column 7, line 43: "performance the" should read as --performance of the--

Column 7, line 47: "same" should read as --time--

Column 8, line 40: "retaining" should read as --holding--

Column 10, line 11: "may be employed assemble" should read as --may be employed to assemble--

Column 10, lines 13-14; "plurality of which" should read as --plurality of nettings which--

Signed and Sealed this

Twenty-seventh Day of October, 1987

Attest:

DONALD J. QUIGG

*Attesting Officer*  *Commissioner of Patents and Trademarks*